United States Patent [19]

Wäldchen

[11] Patent Number: 5,368,128
[45] Date of Patent: Nov. 29, 1994

[54] ELEVATOR CABLE LUBRICATING APPARATUS

[75] Inventor: Hartmut Wäldchen, Alpenrod, Germany

[73] Assignee: Inventio AG, Hergiswil NW

[21] Appl. No.: 118,874

[22] Filed: Sep. 9, 1993

[30] Foreign Application Priority Data

Sep. 9, 1992 [CH] Switzerland ............... 02834/92-3

[51] Int. Cl.⁵ ............. F16N 7/16; F16N 7/24; F16N 13/22
[52] U.S. Cl. ................... 184/15.2; 184/17; 184/15.1; 239/565; 474/91
[58] Field of Search .............. 184/15.1, 15.2, 15.3, 184/17; 239/600, 565, 566; 474/91

[56] References Cited

U.S. PATENT DOCUMENTS

| | | | |
|---|---|---|---|
| 1,794,725 | 3/1931 | Minor | 184/17 |
| 2,703,423 | 3/1955 | Hunt | 184/17 |
| 3,116,811 | 4/1961 | Stevenson | 184/17 |
| 4,095,674 | 6/1978 | Kido et al. | 184/15.2 |
| 4,324,315 | 4/1982 | Charlton | 184/15.1 |
| 4,998,359 | 3/1991 | Rhymer et al. | 239/566 |

FOREIGN PATENT DOCUMENTS

| | | | |
|---|---|---|---|
| 0040301 | 12/1909 | Austria | 184/15.1 |
| 0080423 | 6/1983 | European Pat. Off. | |
| 0816932 | 8/1937 | France | 239/566 |
| 2650366 | 2/1991 | France | |
| 318111 | 1/1920 | Germany | |
| 0617909 | 2/1949 | United Kingdom | 184/15.2 |
| 9102189 | 2/1991 | WIPO | |

Primary Examiner—Thomas E. Denion
Attorney, Agent, or Firm—Howard & Howard

[57] ABSTRACT

An elevator cable lubricating apparatus including a pair of spray pipes extending on opposite sides of a path of travel of elevator cables and being connected to a feed pipe supplying lubricant under pressure. Each of the spray pipes includes a separate nozzle directed toward an associated one of the elevator cables. The apparatus is releasably mounted on two spaced apart supports by pipe clips. The supports also rotatably retain a pair of distributing rollers extending beneath respective ones of the spray pipes. The rollers are slidable toward and away from the rollers in slots formed in the supports and include soft surfaces which embrace the elevator cables and distribute the lubricant sprayed from the nozzles over the entire circumference of the elevator cables. By utilizing only one of the spray pipes and rollers, any linearly moving or rotating machine parts can be lubricated.

7 Claims, 2 Drawing Sheets

ELEVATOR CABLE LUBRICATING APPARATUS

BACKGROUND OF THE INVENTION

The present invention relates generally to an apparatus for lubricating mechanisms during operation and, in particular, to an apparatus for continuously lubricating the cables in an elevator system.

The lubrication of elevator cables is necessary for the care of this important component of an elevator system to prevent corrosion damage and prolong the working life of the cables. Furthermore, such lubrication also determines certain physical properties of the cables such as friction and flexibility.

In the simplest form, the lubrication of the elevator cables is effected manually by means of brushes and/or lubricant-soaked rages or sponge-like bodies. However, mechanical lubricating devices have been used.

According to the French patent application No. 2 650 366, there is shown a device by which several cables can be lubricated simultaneously. The cables to be lubricated are guided through a two-part openable and closable box, the upper and lower passage openings of which each have two brush rows contacting the cables. An electrically driven spray gun is installed in the middle of one side wall of the box. Upon actuation of the spray gun, the lubricant is sprayed into the interior of the box, wherein a lubricant mist is formed and wherein the lubricant settles on all surfaces, including the cables. During the operation of the elevator, the cables are drawn through the box wherein excess lubricant is stripped off, or distributed more evenly over the surface of the cables, by means of the brush rows upon departure of the cables from the box.

That not all cables are uniformly lubricated, because the spray jet directly impinges on only the middle cables, and that the lubricating process is not itself observable are disadvantages of this known equipment.

SUMMARY OF THE INVENTION

The present invention concerns an apparatus for applying a lubricant under pressure to elevator cables. The apparatus includes a spray fork having a tubular feed pipe with an inlet end for connection to a source of lubricant under pressure, an outlet end connector and an intermediate connector, a tubular forward spray pipe having a closed end and an opposite open end coupled to the intermediate connector for receiving lubricant under pressure from the feed pipe and a tubular rearward spray pipe having a closed end and an opposite open end coupled to the outlet end connector for receiving lubricant under pressure from the feed pipe. At least one nozzle is formed in each of the spray pipes for applying the lubricant to an associated elevator cable. A pair of spaced apart supports are provided for mounting adjacent the elevator cable, each of the supports having a pair of slots formed therein extending from an open end toward the elevator cable. A plurality of pipe clips are mounted on the supports for releasably engaging the feed pipe and the spray pipes and for positioning the spray pipes on opposite sides of the elevator cable with the nozzles being directed toward the elevator cable. A pair of distributing rollers are rotatably mounted on the supports on opposite sides of the elevator cable adjacent the spray pipes, each of the rollers having an axle engaging one of the slots in each of the supports and being displaceable toward the elevator cable, each of the rollers having a lubricant distributing surface formed thereon for engaging the elevator cable, the lubricant distributing surfaces being formed from an elastically flexible and absorbent material for conforming to an outer surface of the elevator cable when the roller is displaced toward the elevator cable to press the lubricant distributing surface thereagainst. Thus, the present invention provides cable lubricating equipment in the form of a permanently or temporarily installed lubricant spray apparatus by which a lubricant is sprayed and distributed on elevator cables by means of a continuous process under pressure.

The present invention is based on the task of creating a cable lubricating apparatus by which all cables are necessarily uniformly lubricated, by which the lubricating process is observable and which can be easily installed and used.

This task is solved by the present invention in that a spray fork with spray nozzles directed at the individual cables and rollers embracing the cables and distributing the lubricant are used.

Advantages achieved by the present invention are that the lubricating process is continuously observable due to an open construction, that all cables are lubricated absolutely uniformly and that the entire apparatus is simple and cheap to produce and use.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
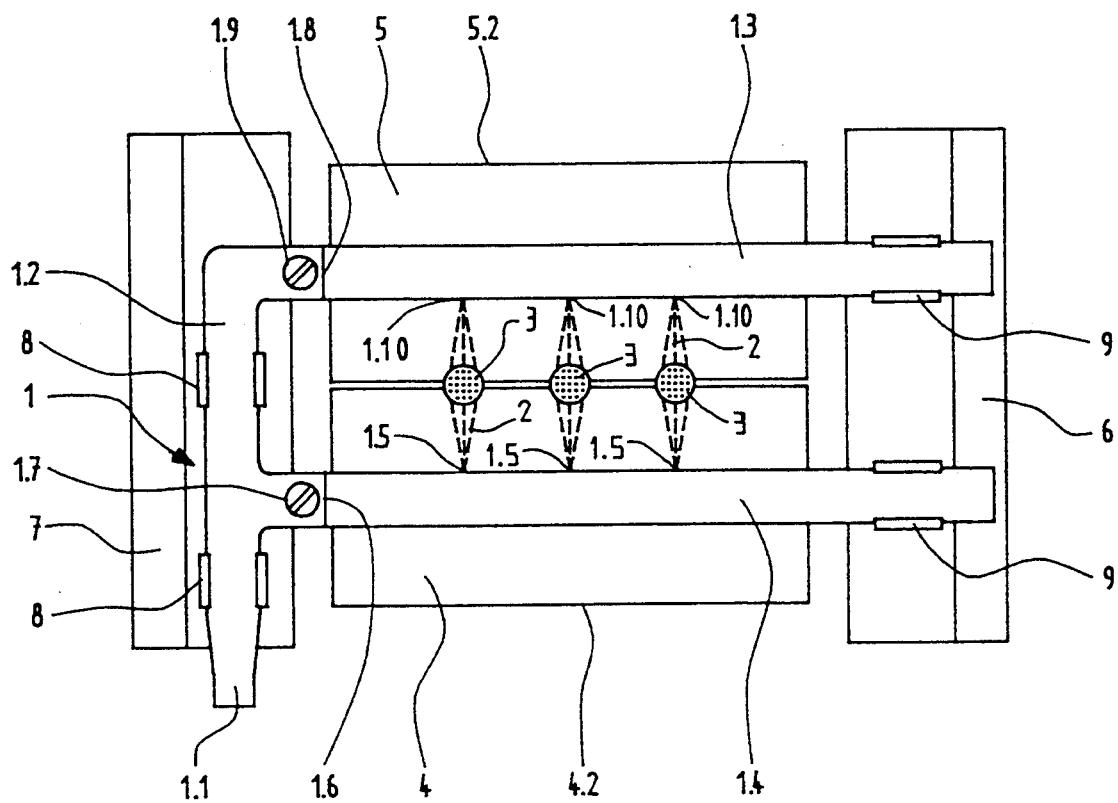
FIG. 1 is a top plan view of an elevator cable lubricating apparatus in accordance with the present invention.

In the FIG. 1, there is shown a spray fork 1 including a tubular stub pipe 1.1 having an inlet end open for connection to a source of lubricant (not shown) and an opposite end formed into a longitudinally extending tubular feed pipe 1.2. Extending transverse to the feed pipe 1.2 are a tubular rearward spray pipe 1.3 and a tubular forward spray pipe 1.4. The spray pipes 1.3 and 1.4 are spaced apart and extend transverse to, behind and in front of respectively, a path of travel of a plurality of elevator cables 3. The forward spray pipe 1.4 includes a plurality of spray nozzles 1.5 which can be of any suitable form such as apertures in a wall of the pipe directed toward associated ones of the cables 3. A first rotary plug connector 1.6 extends from the feed pipe 1.2 and connects with an adjacent open end of the spray pipe 1.4. An opposite end of the spray pipe 1.4 is closed. A fixing screw 1.7 attaches the spray pipe 1.4 to the plug connector 1.6. A second rotary plug connector 1.8 extends from the feed pipe 1.2 and connects with an adjacent open end of the spray pipe 1.3. An opposite end of the spray pipe 1.3 is closed and a fixing screw 1.9 attaches the spray pipe 1.3 to the plug connector 1.8. The spray pipe 1.3 also includes a plurality of spray nozzles 1.10 directed toward associated ones of the cables 3. A spray jet 2 (shown as dashed lines) of lubricant under pressure issues from each of the spray nozzles 1.5 and 1.10 directly onto each the elevator cables 3 from opposite sides thereof.

Figure 2:
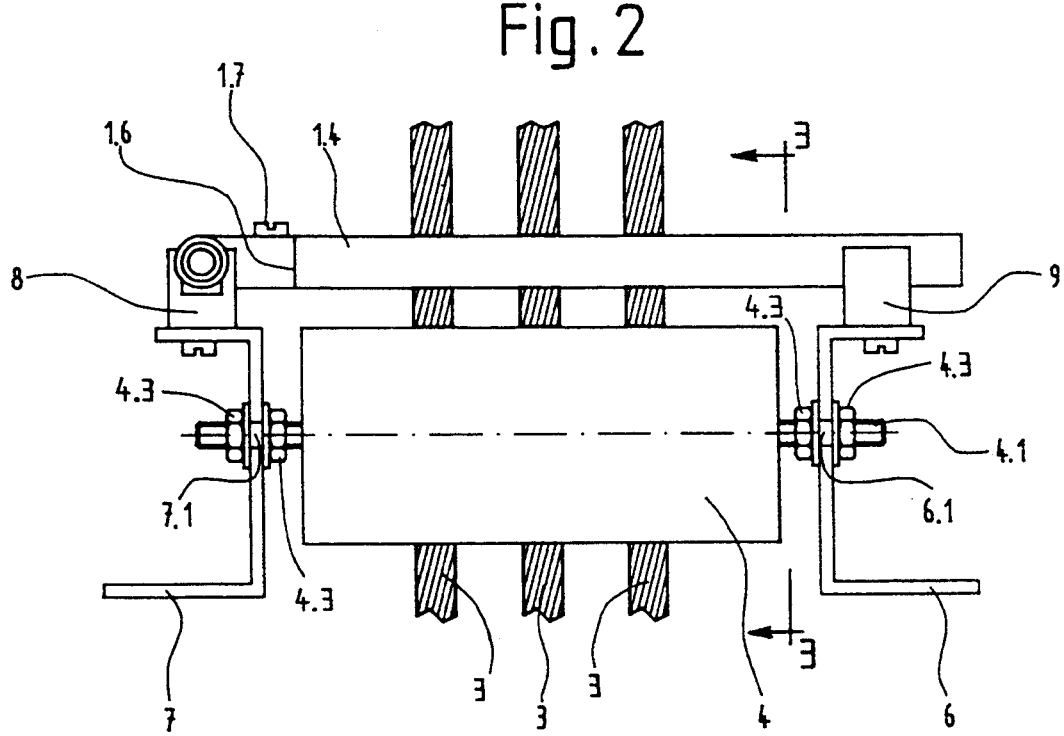
FIG. 2 is front elevation view of the apparatus shown in the FIG. 1.
Figure 3:
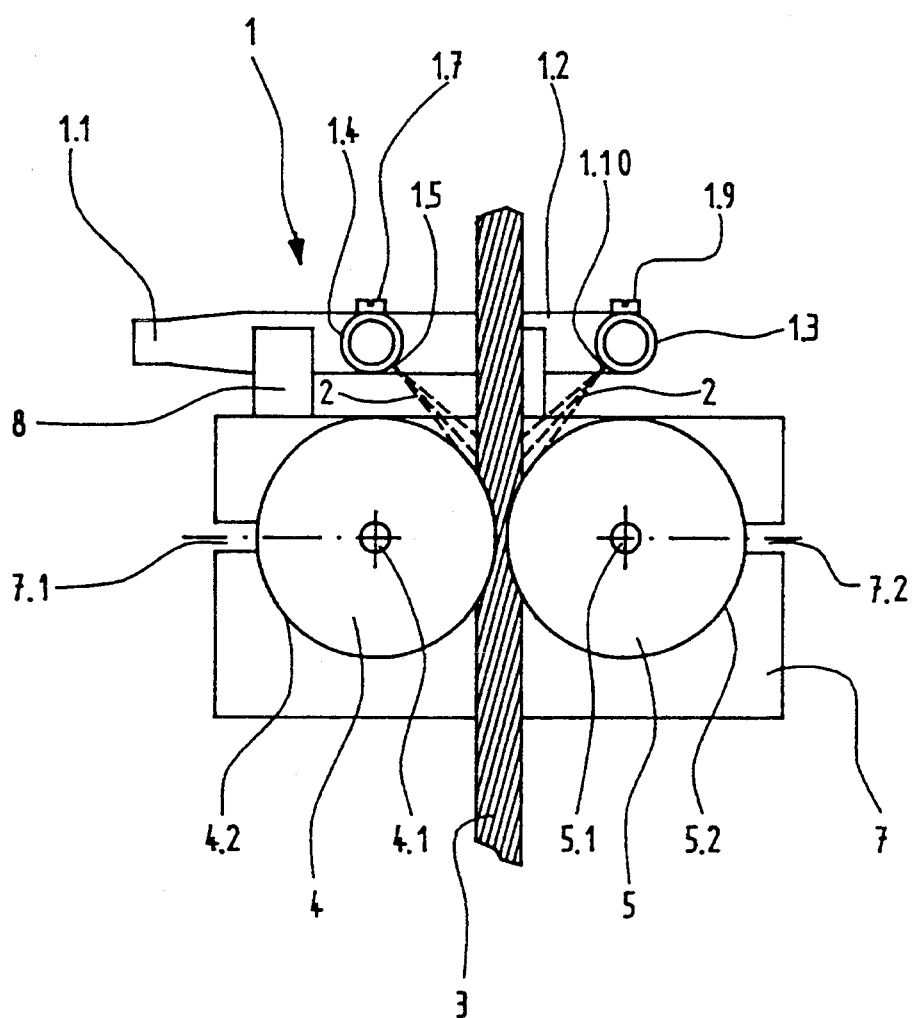
FIG. 3 is a cross-sectional view of the apparatus taken along the line 3—3 shown in the FIG. 1.

A pair of distributing rollers 4 and 5 extend generally parallel to and below the spray pipes 1.4 and 1.3 respectively. The rollers 4 and 5 are rotatably mounted on axles 4.1 and 5.1 respectively. The rollers 4 and 5 also have soft, lubricant-absorbent surfaces 4.2 and 5.2 and are positioned in front of and behind respectively the elevator cables 3 so that the soft surfaces engage the elevator cables 3. The surfaces 4.2 and 5.2 are formed of an elastically flexible and absorbent material which embraces the elevator cables 3 when pressed against them. The spray fork 1 is supported by a pair of supports, a righthand support 6 and a lefthand support 7, extending transverse to the spray pipes 1.3 and 1.4. The supports 6 and 7 are spaced apart and positioned on opposite sides of the path of travel of the cables 3. The spray fork 1 is held at its left side by a pair of pipe clips 8 which releasably engage the feed pipe 1.2 and are mounted on the support 7. The spray fork 1 is held at its right side by a pair of pipe clips 9 which releasably engage the spray pipes 1.3 and 1.4 adjacent their closed ends and are mounted on the support 6. As shown in the FIG. 2, the supports 6 and 7 each are formed of a U-shaped profile member having a shorter upper horizontal leg on which the pipe clips are mounted and a longer lower horizontal leg which rests on a surface (not shown) attached to opposite ends of a vertically extending center section. The roller axle 4.1 rests in a pair of horizontally extending slots 6.1 and 7.1 formed in the center sections of the supports 6 and 7 respectively. The axle 4.1 is secured with a plurality of nuts 4.2. The roller axle 5.1 is secured in a similar manner with only the slot 7.2 being visible in the FIG. 3. As shown in the FIG. 3, the slots 7.1 and 7.2 are open towards the outer edges of the center section of the support 7 and extend inwards such that the distributing rollers 4 and 5 can be moved into engagement with the elevator cables 3. The spray jets 2 issuing from the spray nozzles 1.5 and 1.10 are oriented so that they impinge not only onto the elevator cables 3 but also onto the soft surfaces 4.2 and 5.2 of the distributing rollers 4 and 5 respectively.

The above-described apparatus is installed at a suitable location, for example on the elevator hoist motor frame near the passing elevator cables 3 or near a cable passage opening in the elevator engine room. The supports 6 and 7 are attached to a suitable surface and the rollers 4 and 5 are mounted in the supports. The feed pipe 1.2 can be installed in the clips 8 at any time. The spray pipes 1.3 and 1.4 are then inserted into the rotary connectors 1.8 and 1.6 respectively and fixed thereto by the screws 1.9 and 1.7 respectively. With respect to the spray pipes 1.3 and 1.4, it is to be noted that a range of different lengths will provide for coverage of the most typical cable installations. Different lengths and different arrangements and numbers of spray nozzles can be provided to align opposed spray nozzles 1.5 and 1.10 with a respective cable 3. The open end of the stub pipe 1.1 is then connected by a hose (not shown) to a conventional, for example "Gardena" garden, pressure sprayer (not shown) filled with lubricating oil. The lubricating process proceeds as the cables 3 are moved through the spray fork 1 at low speed, preferably in a down direction, and the pressure sprayer is simultaneously actuated to administer the lubrication as the spray jets 2. The issuing spray jets wet the elevator cables 3 and the soft surfaces 4.2 and 5.2 of the distributing rollers. The soft surfaces 4.2 and 5.2 of the distributing rollers can be formed of such materials as lambskin, plush fabric, synthetic material fleece, Mollton, foam material, toweling or fine bristles. The spraying from the forward and rearward directions produces a local accumulation of the lubricant on the front and back sides of the elevator cables 3. The consecutive travel of the elevator cables 3 through the corotating and similarly lubricant-moistened distributing rollers 4 and 5 effects a uniform distribution of the lubricant on the entire circumference of the elevator cables 3, whereby a qualitatively optimum lubrication comes about. The described apparatus is suitable not only for the application of lubricating oils, but also for the application of lubricating greases. For this use a spray fork geometry is utilized which has a smaller spacing between the spray nozzles and the elevator cables 3. Moreover, a continuously operating greasegun can be connected to the connecting stub pipe 1.1 in place of a pressure sprayer. A further possibility of use of the present invention is that, with only one of the spray pipes 1.3 and 1.4 and a corresponding one of the distributing rollers, and with correspondingly adapted supports 6 and 7 and the feed pipe 1.2, any linearly moving or rotating machine parts can be lubricated with lubricating oil or lubricating grease. Moreover, the lubricant feed can take place from any container by means of a motor-driven pump.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for applying a lubricant under pressure to moving machine parts like elevator cables comprising:

a tubular feed pipe having an inlet end for connection to a source of lubricant under pressure and a connector;

a tubular spray pipe having a closed end and an open end being detachably connected to said feed pipe connector, said spray pipe having at least ne nozzle formed therein for applying a lubricant to a moving machine part;

a pair of spaced apart supports for mounting adjacent opposite sides of a path of travel of a moving machine part;

a least a pair of pipe clips mounted on said supports for releasably engaging said feed pipe and said spray pipe and for positioning said spray pipe adjacent the path of travel of the moving machine part; and a distributing roller rotatably mounted on an axle, said axle having opposite ends mounted in said supports adjacent said spray pipe and the path of travel of the moving machine part, said roller being displaceable toward and away from the moving machine part and having a lubricant distributing surface formed thereon for engaging the moving machine part.

2. The apparatus according to claim 1 wherein said lubricant distributing surface is formed from an elastically flexible and absorbent material for conforming to an outer surface of the moving machine part when pressing thereagainst.

3. The apparatus according to claim 1 wherein said supports each have a slot formed therein extending from an open end toward the moving machine part and said opposite ends of said axle are retained in said slots.

4. An apparatus for applying a lubricant under pressure to elevator cables comprising:

a spray fork having a feed pipe and a pair of spray pipes, each of said spray pipes having a closed end and an open end, said open end of each of said spray pipes being detachably connected to an associated rotary plug connector formed in said feed pipe, each of said spray pipes having at least one nozzle formed therein for applying a lubricant to an elevator cable;

a pair of spaced apart supports for mounting adjacent opposite sides of a path of travel of an elevator cable;

a plurality of pipe clips mounted on said supports for releasably engaging said feed pipe and said spray pipes and for positioning said spray pipes on opposite sides of the elevator cable; and a pair of distributing rollers each rotatably mounted on an associated axle, said axles having opposite ends mounted in said supports on opposite sides of the elevator cable adjacent said spray pipes, said rollers being displaceable toward and away from the elevator cable, each of said rollers having a lubricant distributing surface formed thereon for engaging the elevator cable.

5. The lubricating apparatus according to claim 4 wherein said lubricant distributing surfaces are formed from an elastically flexible and absorbent material for embracing the elevator cable when pressing thereagainst.

6. The apparatus according to claim 4 wherein said supports each have a pair of slots formed therein extending from an open end toward the moving part and said opposite ends of each of said axles are retained in an associated pair of said slots.

7. An apparatus for applying a lubricant under pressure to elevator cables comprising:

a tubular feed pipe having an inlet end for connection to a source of lubricant under pressure, an outlet end connector and an intermediate connector;

a tubular forward spray pipe having a closed end and an opposite open end detachably coupled to said intermediate connector for receiving lubricant under pressure from said feed pipe;

a tubular rearward spray pipe having a closed end and an opposite open end detachably coupled to said outlet end connector for receiving lubricant under pressure from said feed pipe;

at least one nozzle formed in each of said spray pipes for applying a lubricant to an associated elevator cable;

a pair of spaced apart supports for mounting adjacent opposite sides of a path of travel of an elevator cable, each of said supports having a pair of slots formed therein extending from an open end toward the elevator cable;

a plurality of pipe clips mounted on said supports for releasably engaging said feed pipe and said spray pipes and for positioning said spray pipes on opposite sides of the elevator cable with said nozzles being directed toward the elevator cable; and a pair of distributing rollers each rotatably mounted on an associated axle, said axles having opposite ends mounted in said supports on opposite sides of the elevator cable adjacent said spray pipes, each of said rollers having one of said opposite ends of said axle engaging one of said slots in each of said supports and being displaceable toward the elevator cable, each of said rollers having a lubricant distributing surface formed thereon for engaging the elevator cable, said lubricant distributing surfaces being formed from an elastically flexible and absorbent material for conforming to an outer surface of the elevator cable when said roller is displaced toward the elevator cable to press said lubricant distributing surface thereagainst.

* * * * *